United States Patent
Tomka

(10) Patent No.: US 6,242,102 B1
(45) Date of Patent: Jun. 5, 2001

(54) SINGLE OR MULTILAYER FOIL HAVING A LAYER CONTAINING THERMOPLASTICALLY PROCESSABLE STARCH

(75) Inventor: Ivan Tomka, Zollikon (CH)

(73) Assignee: Biotec Biologische Natuverpackungen GmbH & Co., KG (DE)

( * ) Notice: Subject to any disclaimer, the term of this patent is extended or adjusted under 35 U.S.C. 154(b) by 0 days.

(21) Appl. No.: 08/276,715

(22) Filed: Jul. 18, 1994

Related U.S. Application Data

(62) Division of application No. 07/778,164, filed on Dec. 26, 1991, now abandoned.

(51) Int. Cl.⁷ ............................... B32B 15/08; B32B 23/00
(52) U.S. Cl. ........................... 428/451; 428/447; 428/508
(58) Field of Search ................................... 428/447, 451, 428/452, 461, 509, 508

(56) References Cited

U.S. PATENT DOCUMENTS

| | | |
|---|---|---|
| 3,117,014 | 1/1964 | Klug . |
| 3,243,308 | 3/1966 | Barger . |
| 4,327,174 * | 4/1982 | von Meer ............................. 428/342 |
| 4,663,388 | 5/1987 | Douglass . |
| 4,900,361 | 2/1990 | Sachetto . |
| 4,977,211 | 12/1990 | Doi . |
| 5,006,378 * | 4/1991 | Itaba ..................................... 428/34.9 |
| 5,082,882 | 1/1992 | Pettijohn . |
| 5,095,054 * | 3/1992 | Lay . |
| 5,162,392 | 11/1992 | Wool . |

* cited by examiner

Primary Examiner—Christopher Henderson
(74) Attorney, Agent, or Firm—Workman, Nydegger & Seeley

(57) ABSTRACT

A single-layer or multiple-layer foil of substantially reduced gas-permeability comprises at least one layer which consists, at least in part, of substantially thermo-plastically processable starch. In order that this single-layer or multiple-layer foil is at least approximately insensitive to moisture it is proposed that at least one layer comprises furthermore at least one hydrophobic polymer, such as a polyolefin, which is mixed with the starch upon the production of said at least one layer, and/or that the starch is at least partially cross-linked on the surface of said at least one layer and/or that said at least one layer is covered by at least one additional layer which is at least approximately insensitive to moisture.

20 Claims, 5 Drawing Sheets

TABLE 11

| COMPOSITION PERMEABILITY OF THE FOIL | $O_2$ - GAS PERMEABILITY [$cm^2/s \cdot cm\ Hg$] | WATER PERMEABILITY [$g/day \cdot m^2$] |
|---|---|---|
| PVDC | $0.5 \cdot 10^{-12}$ | — |
| PVC | $5 \cdot 10^{-12}$ | — |
| PE / STARCH / PE | $0.3 \cdot 10^{-12}$ | 1 |
| PE | $500 \cdot 10^{-12}$ | 1 |
| AL / STARCH / AL (AL=2x400nm) | $<0.01 \cdot 10^{-12}$ | 130 |
| AL / STARCH / AL (AL=2x500nm) | $0.03 \cdot 10^{-12}$ | — |
| $SiO_x$ / STARCH / $SiO_x$ ($SiO_x$=2x400nm) | $0.6 \cdot 10^{-12}$ | 150 |
| CELLULOSE HYDRATE | $1 \cdot 10^{-12}$ | 400 |
| CELLULOSE ACETATE | $60 \cdot 10^{-12}$ | 250 |

FIG. 11

SINGLE OR MULTILAYER FOIL HAVING A LAYER CONTAINING THERMOPLASTICALLY PROCESSABLE STARCH

This application is a division of U.S. application Ser. No. 07/778,164, filed Dec. 26, 1991, now abandoned, which claims the benefit under 35 under U.S.C. § 120 of earlier filed PCT application Ser. No. PCT/CH91/00078, filed Mar. 27, 1991, and which also claims the benefit under 35 U.S.C. § 119 of earlier filed Swiss Application Serial No. 1'426/90-2, filed Apr. 26, 1990.

BACKGROUND OF THE INVENTION

The present invention relates to a single or multiple-layer foil of substantially reduced gas-permeability, and a method of producing a single-layer or multiple-layer foil, a polymer blend consisting of a polyolefin and starch, a method of producing the polymer blend, thermoplastically processable starch, a method of producing thermoplastically processable starch, a foil consisting of a polymer blend, and a shaped body consisting of a polymer blend.

For the packaging of, for instance, oxygen-sensitive materials such as foodstuffs, it is important that the packing means be of low gas-permeability, i.e. have a low oxygen permeability in the example indicated.

Further requirements on such packing materials are that they be insensitive to moisture, have sufficient mechanical properties, are transparent depending on their use and are of low price.

In particular for the packaging of foodstuffs, there are known sheets of PVC and, even of substantially more general use today, foils of polyvinylidene chloride or PVDC, such as, for instance, "Saran." The gas-permeability of these materials as well as their insensitivity to moisture are excellent. However, these materials have the great disadvantage that the disposal of them is not unobjectionable as a result of their chlorine content, since hydrogen chloride is produced upon burning.

For this reason, these chlorine-containing foils are being increasingly replaced by so-called sandwich foils, such as, for instance, multi-layer foils consisting of a layer of polyamide and a layer of polyethylene or of a layer of polyethylene and a layer of polyvinyl alcohol. There are no limits on the possibilities of variation of the different sandwich foils. In order that these different polymer materials adhere well to each other, intermediate layers of so-called block copolymers are for instance proposed which serve as so-called phase mediators.

In these sandwich foils, the polyamide layer, for example, forms a good barrier to oxygen while, on the other hand, the polyethylene layer is responsible for the impermeability to water. Depending on the properties of the individual polymers and of the required properties of the foil, the layers can be arranged in various manners. Three, four, five or multiple-layer foils, for instance, are known.

The manufacture of these multi-layer foils is, however, relatively expensive since, on the one hand, measures must be taken to see to it that there is good adherence between the individual layers and furthermore the polymers selected, such as, for example, polyamide, are relatively expensive raw materials.

Although these polymers are substantially unobjectionable as compared with chlorine-containing polymers such as PVC or PVDC, their disposal is nevertheless not without problems. Plastics consisting of polyethylene, polyamide, polypropylene, etc. are still today incinerated to a substantial extent since they are scarcely, if at all, biologically degradable. Furthermore, the so-called recycling of these plastics is scarcely possible or is possible only with difficulty.

One object of the present invention is therefore to create a foil for the packaging of materials which is of low gas-permeability, such as, for instance, oxygen permeability, and which furthermore is substantially insensitive to moisture.

Another object of the present invention is to create a polymer material which is suitable, at least in part, for the production of such a foil.

BRIEF DESCRIPTION OF THE DRAWINGS

FIGS. 6–11 chart characteristics of the invention.

DESCRIPTION OF THE INVENTION

Figure 1:
FIGS. 1–5 show various constructions of foils in accordance with the invention as described in the examples.

In accordance with the invention, this object is achieved by a single-layer or multiple-layer foil of substantially reduced gas-permeability described below.

There is proposed a single-layer or multiple-layer foil of substantially reduced gas-permeability which comprises at least one layer which is made, at least in part, of substantially thermoplastically processable starch. Foils of starch have the required reduced gas-permeability and furthermore the disposal of starch presents no problem since it is easily biologically degradable.

It is furthermore proposed that said at least one layer be made of a polymer blend, the blend containing a polyolefin in addition to the thermoplastically processable starch. In this way, the sensitivity to moisture of the foil is greatly reduced.

It is proposed in this connection that said at least one layer consist of a polymer blend which is produced from thermoplastically processable starch with polyethylene and/or polypropylene, as well as a phase mediator or bond promotor in order to improve the adherence between the two polymers.

In accordance with the present invention, there is furthermore proposed a single-layer or multiple-layer foil of substantially reduced gas-permeability which is at least substantially insensitive to moisture, the foil comprising at least one layer obtained in part from substantially thermoplastically processable starch and having a water content of <3.5 wt. %, the insensitivity to moisture of the foil resulting from the fact that said at least one layer furthermore comprises at least one hydrophobic polymer which is mixed with the starch upon the production of said at least one layer and/or that the starch is at least partially cross-linked on the surface of said at least one layer and/or that said at least one layer is covered by at least one additional layer which is at least substantially insensitive to moisture.

In a variant of the foil in accordance with the invention, the foil comprises on both sides of said at least one layer at least one further layer consisting of a polyolefin and/or a polymer blend of thermoplastically processable starch with a polyolefin. The polyolefin is preferably polyethylene and/or polypropylene. When very high demands are made on the moisture imperviousness of the foil, the other layers consist exclusively of a polyolefin.

Depending on the requirements as to the adherence between the different layers, there is present between said at least one layer and each of said further layers an intermediate layer consisting of a block copolymer as phase mediator or bond promotor between the layers. An intermediate layer consisting of the block copolymer is preferably provided when said at least one layer consists substantially exclusively of thermoplastically processable starch and the two other layers consist substantially primarily of the polyolefin. The larger the proportion of thermoplastically processable starch in said each other further layer, the less necessary it is to provide an intermediate layer consisting of the block copolymer.

In accordance with another variant of the foil of the invention, it is provided that the foil is provided on at least one side with an aluminum coating and/or a silicon- oxide coating such as, for instance, a silicon monoxide coating. In this connection, the foil may be a single-layer, double-layer or multiple-layer foil, as described above.

The aluminum or silicon oxide coating is applied in an order of magnitude of 100 to 400 A. Silicon oxide, such as preferably silicon monoxide, is selected as coating for the foil when the transparency of the foil is to be substantially retained. The coating of the foil with aluminum or silicon oxide is preferably effected by vapor deposition on the foil in a high vacuum.

In accordance with another variant of the foil of the invention, it is proposed that, at least on one side, the foil have a siloxane coating which is at least partially cross-linked with itself and/or with the starch. This again may be a single-layer or multiple-layer foil, as described above. The siloxane coating of the foil is obtained in the manner that a siloxane monomer, such as, for instance, an alkyl siloxane, is applied to at least one side of the foil and the siloxane is then treated with an electron gun, whereby the siloxane is cross-linked to itself and in part to the starch on the surface of the foil. By the addition of a photosensitizer to the siloxane monomer the cross-linking to the starch can be additionally increased.

The coating of the foil with the siloxane monomer is effected preferably by means of so-called dip coating in which the sheet is dipped into a bath which contains the siloxane monomer, and the siloxane film is then produced by means of a doctor blade. The depth of penetration upon the cross linking is about 7 to 10 $\mu$, depending on the energy selected in the UV source or in the electron beam.

The foil can be coated with the siloxane on one or both sides.

As alkyl siloxanes, diethoxydimethylsilane or tetraethoxysilane is particularly suitable. The application of the siloxane monomer is preferably effected in a thickness of 1 $\mu$.

Instead of applying a coating to the foil it is possible, in accordance with another variant, to treat the foil on its surface with a UV source or an electron gun in such a manner that the starch is at least partially cross-linked on the surface of the foil. The cross-linking has the result that the water resistance of the starch is increased. The cross-linking can be further increased by adding a photosensitizer to the starch.

In accordance with another variant of the foil of the invention it is proposed that borax, $Mg^{2+}$ ions and/or $Ca^{2+}$ ions or other polyvalent cations be added to the thermoplastically processable starch. This is done in the manner that, upon the production of the thermoplastically processable starch, it is treated with borax, magnesium sulfate or calcium carbonate. The advantage of these additions is that the water sensitivity of the starch can be reduced thereby.

The abovementioned single-layer or multiple-layer foils can be produced by the known, customary methods of producing foils. Thus, for instance, said at least one layer of foil which consists essentially of thermoplastically processable starch can be produced by slot extrusion or by blowing thermoplastically processable starch or a polymer blend consisting of thermoplastically processable starch with a polyolefin, such as preferably polyethylene or polypropylene. The blowing or extrusion conditions depend in this connection on the melting point of the polymer selected.

In analogous manner it is possible to produce, for instance, a three-layer foil by slot backing or blow coextrusion of at least three layers, said at least one layer, consisting substantially of thermoplastically processable starch, being covered on both sides by a further layer which is prepared from a polyolefin and/or a polymer blend of thermoplastically processable starch and a polyolefin, such as preferably polyethylene or polypropylene. Depending on the requirements, it is furthermore possible to provide an intermediate layer consisting of a block copolymer between said at least one layer and said further layers in order to increase the adherence between the layers.

Also in the present case, the extrusion or blowing conditions depend on the melting ranges of the polymers or polymer blend selected, in which connection the extrusion conditions for the thermoplastically processable starch should not substantially exceed 210° C. since otherwise degradation of the starch can be noted.

There is furthermore proposed a polymer blend consisting of a polyolefin and starch which is particularly suitable for the production of a foil in accordance with the invention which has been described above. This polymer blend is obtained by mixing a polyolefin such as, for instance, polyethylene or polypropylene, with thermoplastically processable starch having a water content of <3.5 wt. %, the percentage of starch in the total mixture not exceeding 70 wt. %. The proportion of thermoplastically processable starch is preferably 30 to 70 wt. %, referred to the total weight of the polymer blend.

In particular, the polymer blend is obtained in the manner that the polyolefin, such as polyethylene or polypropylene, is mixed with the starch in a kneader or extruder within a temperature range of 150° C. to 200° C., and preferably 160° C. to 190° C., the temperature range depending on the melting range of the polyolefin selected.

A phase mediator is furthermore preferably added, it being a block copolymer which is customarily used in the production of multiple-layer foils as intermediate layer or else in the production of polymer blends from polar and non-polar polymers.

For the production of such a polymer blend with starch it is essential that thermoplastically processable starch be used. There are known, for instance, polymer blends of polyethylene with 40% of an at least partially destructured starch, the destructuring being effected substantially by the use of water. Shaped bodies produced from such polymer blends are brittle and the production of foils is substantially out of the question. This is due, not least of all, also to the high water content of the destructured starch.

As compared with this, it is possible with the abovementioned polymer blends of the invention, with the use of preferably 30 to 70 wt. % of thermoplastically processable starch, to produce excellent foils and shaped bodies the mechanical and physical properties of which do not differ substantially from those of polyolefin. In this connection, the amount of the thermoplastically processable starch used depends on the desired moisture insensitivity of the polymer blend, sufficient insensitivity to moisture being obtained also with the use of 70% starch as previously. Thus, for instance, such a polymer blend becomes tacky on its surface only when exposed to 100% air humidity. On the other hand, this polymer blend can be stored without problems at 40% air humidity and room temperature.

In the case of the foils of the invention mentioned above or for the said polymer blend, there is proposed the use of thermoplastically processable starch which is obtained by mixing starch and/or a starch derivative with at least 20 wt. % of an addition substance, by feeding thermal or mechanical energy and by at least partially removing the naturally bound moisture in the starch, the addition substance comprising at least one of the following substances:

glycerol, an amino alcohol,

DMSO,

N-methylacetamide, urea.

The thermoplastically processable starch preferably has a water content of <3.5% and in particular <1 wt. %.

In order to produce the thermoplastically processable starch, it is proposed that the starch and/or a starch derivative be mixed with at least 20 wt. %, and preferably 25 to 45 wt. %, of an addition substance with the feeding of mechanical energy in the form of deformation energy on the order of magnitude of 0.25 to 0.5 kWhr/kg of starch/addition-substance mixture, the mixture being heated at least to a temperature such as to permit a mixing of the components so as to form a homogeneous mass and said at least one addition substance comprising at least one of the abovementioned substances.

In contradistinction to the methods of destructuring native starch which have been customary up to the present time, in which the destructuring is effected substantially with the aid of water, there is obtained, in accordance with the method proposed herein, a thermoplastically processable starch which can be worked without problems by the known extrusion and injection molding methods and by means of which shaped bodies and extruded bodies which have excellent mechanical properties can be produced. In particular, the thermoplastically processable starch, in contradistinction to starch which is destructured with water, has an excellent stress-strain behavior which does not deteriorate even upon aging.

Thus, shaped bodies made of thermoplastically processable starch are flexible within limits, while shaped bodies made from starch which has been destructured with water are substantially brittle, particularly after a certain period of aging.

In accordance with a variant of the method proposed above, starch is mixed with 25 to 40 wt. %, and preferably 32 to 38 wt. %, of an amino alcohol, such as aminoethanol, aminopropanol and/or trishydroxylethylaminomethane, the mixture being processed, depending on the nature of the addition substance and the amount thereof, within a temperature range of 60° C. to 120° C. in an extruder or kneader with the feeding of deformation energy of 0.3 to 0.36 kWhr/kg of starch/aminoethanol mixture so as to form a homogeneous mass. The natural moisture of the starch is in this connection removed either before the mixing with the amino alcohol by drying or else upon the mixing, for instance in the kneader or extruder, in accordance with known methods, for instance by aspiration.

In accordance with another variant, the starch or starch derivative is mixed with 30 to 45 wt. %, and preferably 34 to 40 wt. %, glycerol and worked, depending on the amount of addition substance, within an temperature range of 120° C. to 180° C. in an extruder or kneader while feeding a deformation energy of 0.3 to 0.36 kWhr/kg of starch-glycerol mixture so as to form a homogeneous mass. The natural moisture of the starch is substantially withdrawn by aspiration in the extruder or kneader.

In order to reduce the sensitivity to moisture of the thermoplastically processable starch it is advantageous to replace up to 20 wt. %, and preferably about 10 wt. %, of the addition substance by borax, magnesium sulfate or calcium carbonate upon the production of the thermoplastically processable starch.

The abovementioned thermoplastically processable starch as well as the polymer blend are particularly suitable for the production of one or more layers in the abovementioned foils of the invention. Of course, these materials can also be used for the production of extruded products or injection moldings.

The invention will now be explained in further detail below with reference to the accompanying figures and on basis of examples.

FIGS. 1 to 5 show, on basis of examples, possible variant constructions of foils in accordance with the invention.

FIG. 1 shows a single-layer foil which comprises one layer 1. This one layer consists of a polymer blend in accordance with the invention, prepared from a polyolefin and thermoplastically processable starch, In this connection, the proportion of thermoplastically processable starch can be 30 to 70 wt. %, referred to the total weight of the polymer blend. The proportion of thermoplastically processable starch depends on the requirements as to the moisture sensitivity of the film. The oxygen barrier in this film is determined essentially by the proportion of thermoplastically processable starch, while the water impermeability can be adjusted by the proportion of polyolefin, such as for instance polyethylene.

Figure 2:
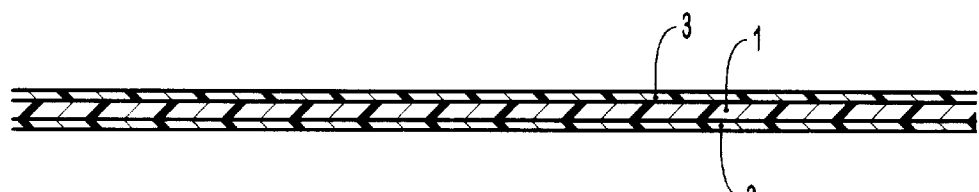

FIG. 2 shows a single-layer foil covered on both sides by a coating 3. In the example shown, the layer 3 consists of thermoplastically processable starch, while the coatings 3 may be an aluminum coating, a silicon-oxide coating, or a siloxane coating. While in the case of aluminum or silicon oxide, the layer thickness is 100 to 400 A, the layer thickness of the siloxane coating is on the order of magnitude of 1 $\mu$. In case of the use of aluminum, the foil shown has excellent imperviousness to oxygen and its resistance to water is also excellent. The advantage of the use of silicon oxide, such as for instance silicon monoxide, is that the foil is still transparent. On the other hand, the water resistance and oxygen resistance are not as good as when aluminum is used. The advantage of the siloxane coating resides in the excellent water resistance of the foil.

Figure 3:
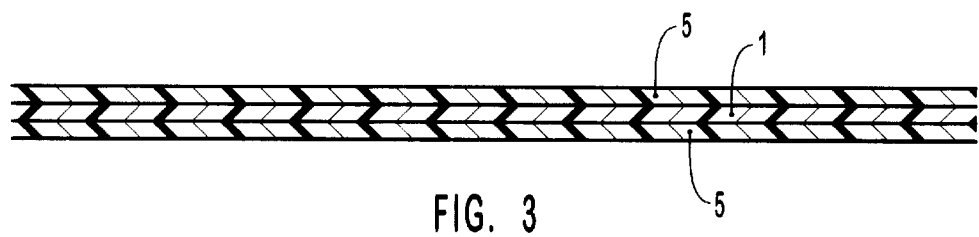

In the example shown in FIG. 3, a three-layer foil is shown, it consisting of a central layer 1 and two peripheral layers 5. The central layer 1 consists of thermoplastically processable starch while the two peripheral layers 5 consist of polyolefin, such as for instance polyethylene. Inbetween the layers 1 and 5 an intermediate layer of a block copolymer can be arranged, as is customary in the production of multiple-layer foils.

In the example shown, the central layer 1 is responsible for the oxygen barrier, while the two polyethylene layers assure the water impermeability of the foil. The layer thicknesses in this connection can be selected as required, i.e., for example, the two layers 5 may each be 1 $\mu$ while the central layer 1 is 7 $\mu$. It is however definitely also possible for the two outer layers 5 to be 30 $\mu$ in thickness while the central layer is 60 $\mu$.

Figure 4:
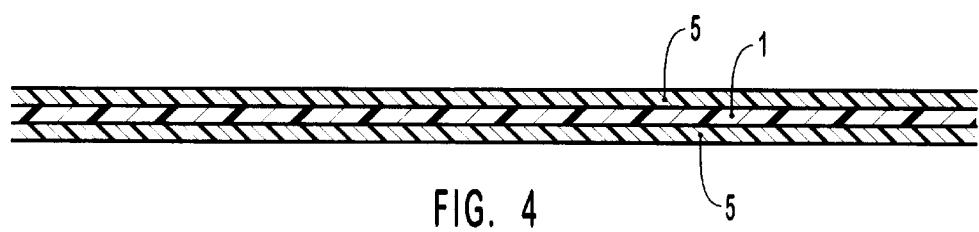
Figure 5:
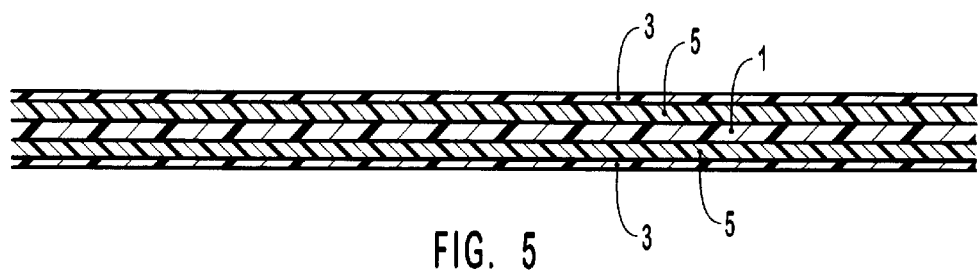

The example shown in FIG. 4 is practically identical to the foil of FIG. 3 only that the two peripheral layers 5 consist of a polymer blend which has been produced from a polyolefin with thermoplastically processable starch. In this case, the water resistance of the two peripheral layers 5 depends on the polyolefin content of the polymer blend. This foil can always be selected when the requirements as to water imperviousness are not too high. The advantage of this foil resides on the one hand in its price, since the starch is somewhat cheaper than polyethylene and, on the other hand, starch is biologically very easily degradable upon disposal, while polyethylene must be incinerated.

FIG. 5, finally, again shows a three-layer foil similar to FIG. 4, coated on both sides by a coating 3. The coating 3 can be selected similar to the coating 3 in FIG. 2, i.e. it may consist of aluminum, silicon oxide or silane.

The examples of a foil in accordance with the invention which are shown in FIGS. 1 to 5 can, of course, be varied in numerous ways. Thus, of course, two-, four- , five- or multiple-layer foils can be produced. Furthermore, it is possible, for instance, to coat a foil only on one side.

The production of thermoplastically processable starch, of polymer blends, and of foils in accordance with the invention will now be described in further detail on the basis of examples, with reference to FIGS. 6 to 11.

A. Production of thermoplastically processable starch

First Example: Glycerol Starch

Potato starch and 36 wt. % glycerol, referred to the total weight of glycerol/starch, were introduced into a twin-shaft extruder. The mixture was intensively mixed in the extruder at about 160° C. with the addition of deformation energy of 0.32 kWhr/kg of starch/glycerol mixture, the melt being at the same time degassified in order to remove the water from the starch. As a result of the mixing of the two components a homogeneous melt is obtained which can then be withdrawn and granulated. The water content of the thermoplastically processable starch which has been homogenized in this manner is about 0.3 wt. %.

By the mixing and homogenizing of the native starch with glycerol, all crystallites and crystal structures of the native starch are broken up and the starch is substantially amorphous in the thermoplastically processable starch. In contradistinction to this, destructured starch which has been produced by known methods from native starch by destructuring with water at elevated temperatures still has a certain crystallinity. The difference between thermoplastically processable starch and destructured starch can be shown, for instance, on the basis of the water vapor absorption isotherms.

Figure 6:
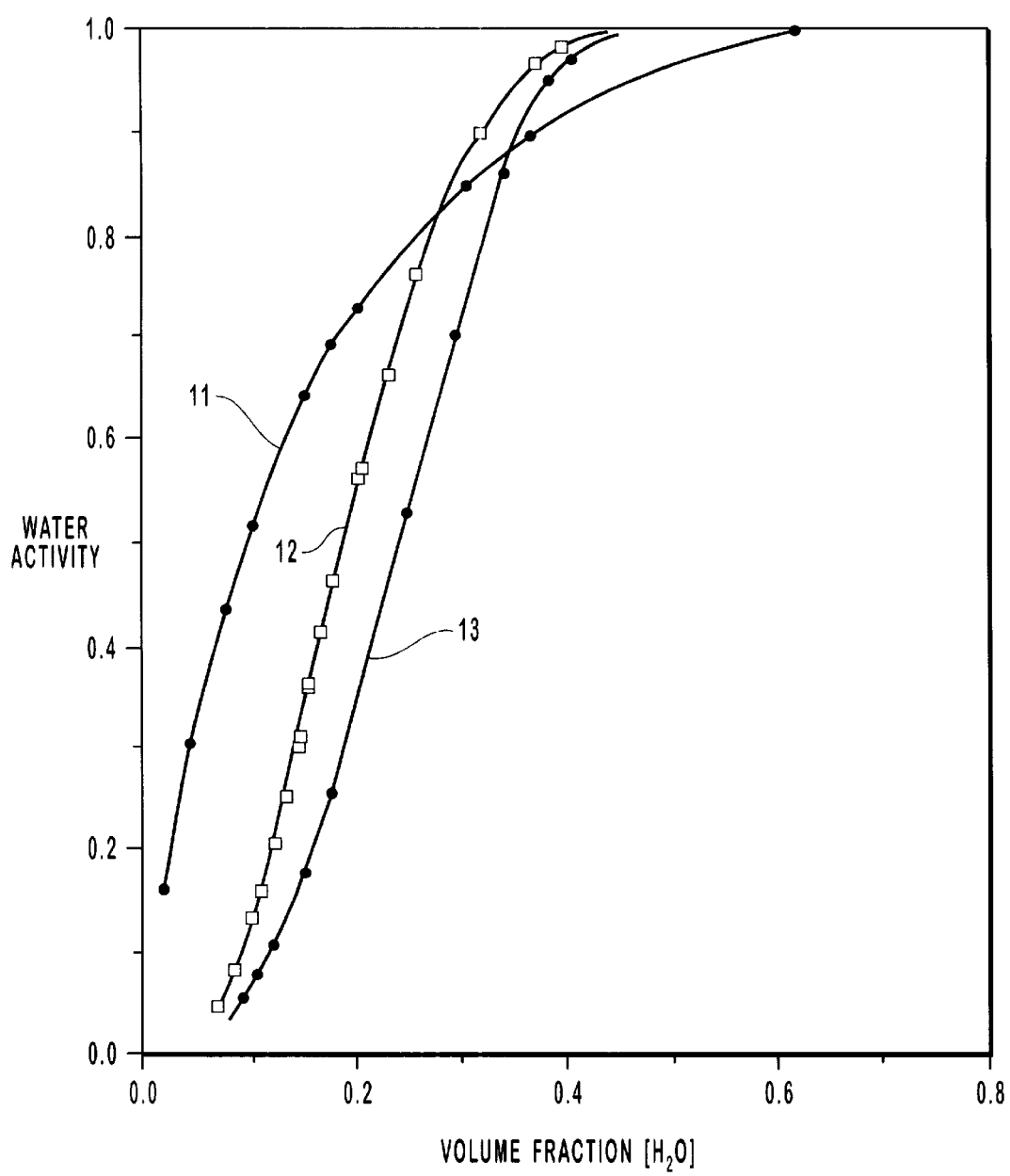

FIG. 6 shows in this connection a water-vapor absorption isotherm for thermoplastically processable starch as well as for destructured starch.

The water-vapor absorption isotherm 11 shows the water absorption of thermoplastically processable starch prepared in accordance with Example 1. The essential feature of this isotherm is that it does not have any point of inversion. It can furthermore be noted that the desorption isotherm is identical to the absorption isotherm. Curve 12 shows the water-vapor absorption isotherm of destructured starch which has been destructured with 25% water at 125° C. In contradistinction to the isotherm 11, curve 12 shows two points of inversion.

Curve 13 furthermore shows the desorption isotherm of destructured starch, which is not identical to the water-vapor absorption curve. The desorption is obviously delayed as compared with the absorption.

The isotherms in FIG. 6 were furthermore measured at 20° C.

Another difference between thermoplastically processable starch in accordance with the present invention and destructured starch is that, even in the event of advanced aging, the water-vapor absorption isotherm of thermoplastically processable starch remains substantially the same while that of destructured starch changes with aging.

Thermoplastically processable starch differs furthermore from water-destructured starch by a different glass transition point. The glass transition point or GT of thermoplastically processable starch is below room temperature while the glass transition point of the destructured starch having a water content of <18 wt. % is always above 40° C., as a result of which the material is brittle. With more than 18 wt. % water, the starch is sticky, as a result of which the material always has a certain flexibility. This feature is retained even upon aging of thermoplastically processable starch, while in the case of destructured starch the glass transition point increases with aging in such a manner that the material becomes brittle after a certain period of time.

Another feature of thermoplastically processable starch resides in its extremely low water content, which is normally <3.5 wt. % and preferably <1 wt. %.

Second Example: Thermoplastically Processable Starch with an Amino Alcohol 2.1 Ethanolamine Native starch was dried at 100° C. for two days in a drying oven. Two mixtures were then prepared with ethanolamine, namely one mixture with 30 wt. % ethanolamine referred to the total weight of the starch/ethanolamine mixture and a second mixture with 34 wt. % ethanolamine.

Both mixtures were then homogenized in a kneader at 100° C., the moment of rotation of the kneader being so selected in the case of the first mixture as to introduce a deformation energy of 0.3 kWhr/kg of starch/ethanol mixture, while 0.34 kWhr/kg of starch/ethanol mixture were added to the second mixture by adjustment of the moment of rotation. Thereupon, plates were pressed with the two homogenized compositions for 15 minutes at 100° C. No undigested starch granules could be noted any longer in the two plates under a microscope. The two plate specimens were thereupon subjected to bending tests, the first specimen, containing 30 wt. % ethanolamine breaking immediately as the result of high brittleness while the second specimen, containing 34 wt. % ethanolamine, was bendable due to a certain flexibility.

It was furthermore also found that the water sorption of the first sample was substantially greater than the water sorption of the second, flexible specimen.

2.2 3-Amino-1-Propanol

Once again, native starch was dried for two days in a drying oven at 100° C. Again two mixtures were prepared, namely in one case with 32 wt. % of 3-amino-1-propanol referred to the total weight of the mixture and in the other case with 36 wt. % of 3-amino-1-propanol, referred to the total weight of the mixture.

The two mixtures were thereupon again homogenized at 100° C. in a kneader, the moment of rotation of the kneader being so selected that in the first case a deformation energy of 0.29 kWhr/kg of mixture and in the second case a deformation energy of 0.32 kWhr/kg of mixture were fed. After homogenization of the compositions, plates were again formed by pressing, again for 15 minutes at 100° C.

Subsequent bending tests showed that the plate of the first mixture was relatively brittle and broke already upon the slightest bending, while the second sample showed increased flexibility and broke only after strong bending. Again, the first specimen showed greater water sorption as than the second.

Of course, the mixtures and processing conditions indicated above in the first and second examples are to be considered merely examples and of course native starch may be thermoplastically processable also with a different content of the addition substance and at other processing temperatures. It was, to be sure, found that upon the use of glycerol the amount of addition is ideally 36 to 38 wt. %, referred to the weight of the total mixture.

Upon the addition of aminoethanol or ethanolamine, the amount of addition is ideally 35 wt. %, upon the addition of aminopropanol ideally 34 to 36 wt. %, and upon the addition of trishydroxyethylaminomethane ideally 34 to 36 wt. %. For the added deformation energy, an ideal value of 0.32 kWhr/kg of starch/addition mixture was found, in which connection deviations from this value also led to the goal.

B. Production of a Polymer Blend

Third Example: Polymer Blend of Polyethylene and Thermoplastically Processable Starch I started from thermoplastically processable starch or glycerol starch such as prepared in Example 1.

A mixture of 50 wt. % low-density polyethylene (LDPE), 40 wt. % glycerol starch, and 10 wt. % of a block copolymer (Orevac 18211 of Ato Chemie) were mixed and introduced together into a kneader. The mixture was compounded at a temperature of 160° C. with the introduction of 0.2 kWhr/kg of mixture and then granulated.

With this polymer blend, containing 40 wt. % thermoplastically processable starch, standard bodies were produced and the water absorption on the one hand and the stress/strain behavior on the other hand measured.

The shaped bodies were stored for 10 hours in boiling water after which a water absorption of at most 2% could be noted.

Figure 10:
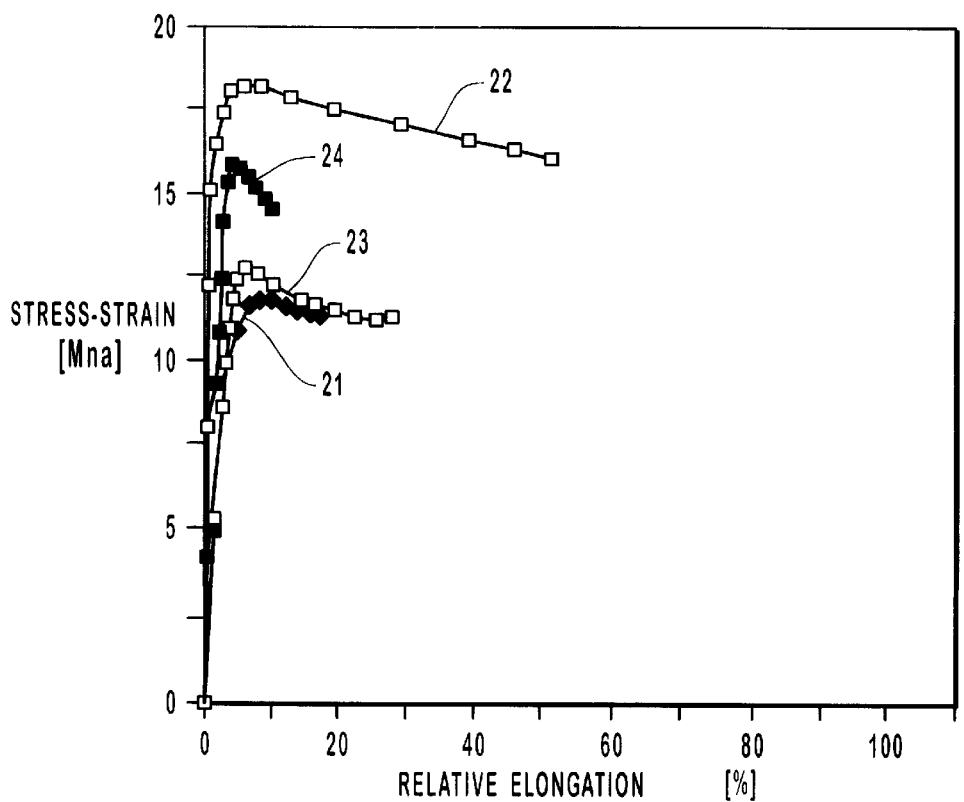

The stress/strain behavior was measured by means of a simple elongation test at 20° C. The curve obtained is shown in FIG. 10 and bears the reference number 21. The stress/strain curve will be discussed later.

Thereupon another mixture, containing 70 wt. % of thermoplastically processable starch, 20% of polyethylene, and 10% block copolymer was worked in the kneader to form the corresponding polymer blend. The compounding conditions were the same as indicated above. Standard bodies were again made from this polymer blend in order to measure the water resistance. The standard bodies were stored for 10 hours at 70% relative humidity and room temperature without noting any deformation on the surface.

On the other hand, with 100% relative humidity, and therefore in contact with liquid water, it was found that the surface of the standard bodies had become sticky.

On the basis of the two polymer blends produced it can be concluded that the amount of addition of the starch, referred to the total weight of the polymer blend, is to be selected in accordance with the requirements as to water resistance, but that a value of 70 wt. % should not be exceeded. Evidently, sufficient polyethylene must still be present in the polymer blend to form a coherent structure of the polyethylene in the blend. If good water resistance is necessary, the proportion of thermoplastically processable starch in the polymer blend should not exceed 50 wt. %.

Referred to the phase mediator or the block copolymer, it may be stated that an amount of addition of 2 to 5 wt. % already gives good phase mixing of the two polymers. As phase mediator other materials can, of course, also be used such as, for instance, Lotader of CDF Chemie, which is a reactive terpolymer of ethylene-acrylate (ethyl or butyl)-maleic anhydride and ethylene-methyl acrylate-glycidyl methacrylate (epoxide functionality), Novatec of Mitsubishi Chemicals, Surlyn of DuPont, which is a partially neutralized ethylene/methacrylic acid copolyer, and Lonply of Mitsui Toatsu, which is a copolymer of ethylene or propylene with maleic anhydride. Said block copolymers are products which are customarily used in the compounding of two-phase polymer blends.

Figure 7:
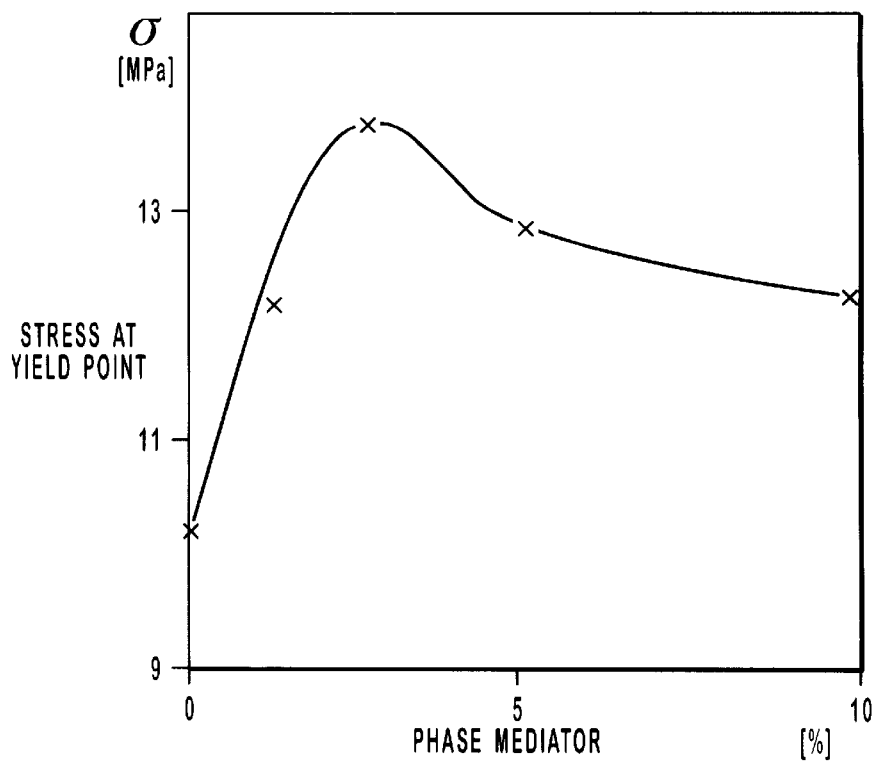
Figure 8:
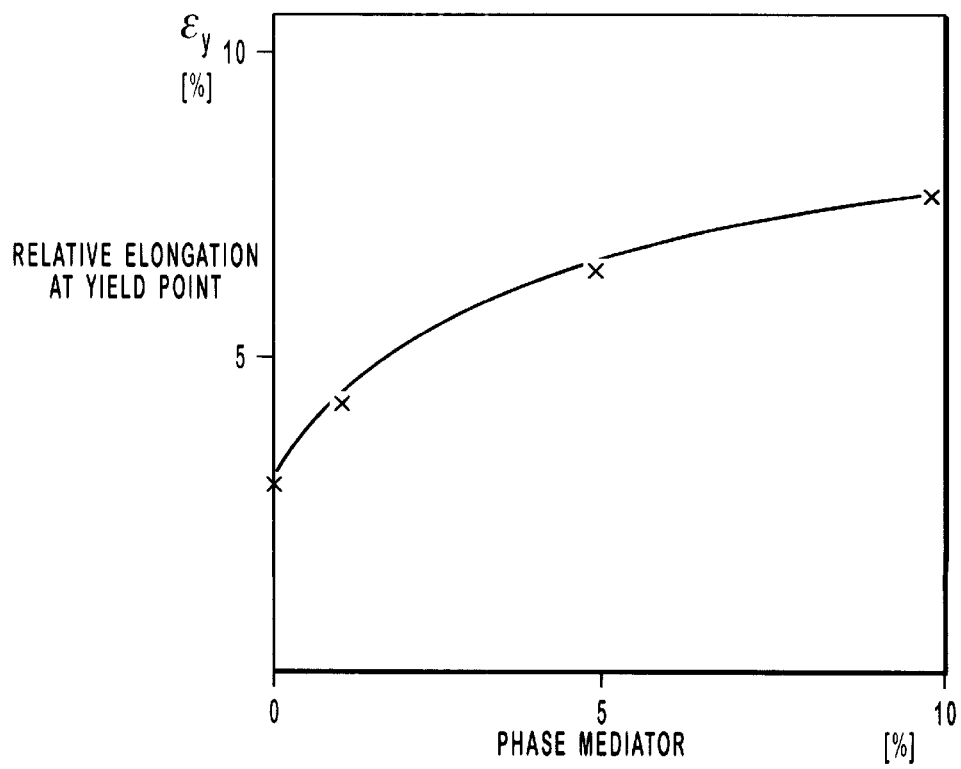
Figure 9:
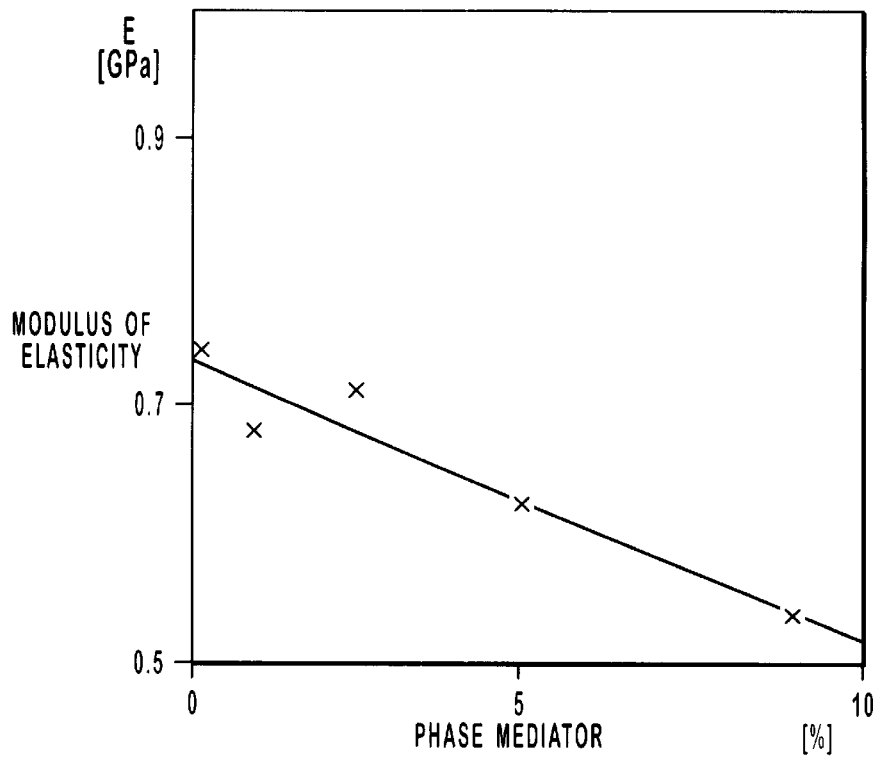

FIGS. 7 to 9 show the effect of the amount of phase mediator added on the one hand on the stress at the yield point, on the relative elongation at the yield point and on the modulus of elasticity. I started from a polymer blend of 50 to 60 wt. % polypropylene, 40 wt. % thermoplastically processable starch in accordance with Example 1, and 10 to 0 wt. % added phase mediator Lotader 3318.

FIGS. 7 to 9 show the effects of different added quantities of phase mediator. In FIG. 7 the stress at the yield point is shown, it passing through an optimum at about 3 wt. % added phase mediator, and then assuming a more or less constant value as from 5 wt %.

The same can be noted in connection with the relative elongation at the yield point from FIG. 8, where the value also remains more or less constant as from 5% added phase mediator.

As compared with this, the modulus of elasticity decreases linearly with the amount of phase mediator added.

Fourth Example: Polymer Blend from Thermoplastically Processable Starch and Polypropylene I again started from glycerol starch, as prepared in Example 1. 40 wt. % of the glycerol starch was mixed with 50 wt. % of polypropylene and 10 wt. % of Lotader 2400 of CDF Chemie and introduced into a kneader. The polypropylene used had a melt index (MFI) of 20 g/10 sec at 190° C. and a load of 5.61 kg. The mixture was mixed in the kneader at 190° C. and 0.2 kWhr/kg of mixture and then granulated. Again standard bodies were extruded and the stress/strain behavior measured by means of strain tests at 20° C.

The corresponding stress/strain curve is also shown in FIG. 10 and bears the reference number 22.

Discussion of FIG. 10

FIG. 10 shows a stress/strain diagram in which different test bodies were subjected to elongation tests at 20° C.

For this purpose, standard bodies, prepared from polymer blends with polyethylene and polypropylene as mentioned above, were compared with standard bodies prepared from pure thermoplastically processable starch. Curve 21 shows the stress/strain behavior of a polymer blend with polyethylene and 40 wt. % of thermoplastically processable starch and Curve 22 shows a polymer blend with polypropylene and 40 wt. % of thermoplastically processable starch.

By way of comparison, two stress/strain curves of samples of starch are also included in FIG. 10, they being designated by 23 and 24.

Curve 23 shows the stress/strain curve of a thermoplastically processable starch with 30 wt. % glycerol, to which 0.32 kWhr/kg of starch/glycerol mixture had been added in the kneader upon production.

Finally, Curve 24 refers to the thermoplastically processable starch as prepared in Example 1, i.e. with 36 wt. % glycerol.

Upon comparison of the four curves it is clear that sample 23 has the lowest strength.

As compared with this, sample 24 has increased strength but cracks take place already upon a relatively short elongation of about 12%.

The stress/strain behavior of samples 21 and 23 is approximately the same, while samples 22 and 24 have a high tensile strength with a particularly high yield point.

It can be concluded from this that upon the production of polymer blends, particularly with polyethylene, the tensile strength is approximately comparable to that of pure thermoplastically processable starch. Since Curve 24, in particular, even has a higher tensile strength than Curve 21, it is assumed that by the incorporation of thermoplastically processable starch in polyethylene the mechanical properties, referred to pure polyethylene, are not impaired. A prerequisite for this, to be sure, is that the plasticization of the starch takes place in accordance with the processing conditions required in the invention.

In addition, it could also be noted that the cracking of the samples from the two polymer blends takes place at a substantially higher elongation than in the case of the pure starch samples.

C. Production of Foils

Fifth Example: Production of a Single-Layer Starch Foil

I proceeded from a thermoplastically processable starch having a glycerol content of 35.6 wt. % and a water content of 0.5 wt. %, referred to the total weight of the starch mixture.

The starch was melted in a single-shaft extruder with an L/D ratio of 30 and within a temperature range of 180° C. to 200° C., operated with a speed of rotation of 110 rpm and a pressure of 90 to 120 bar. As temperature of the composition a value of 212° C. was measured. A clear transparent foil was extruded in a slot nozzle at a temperature of 170° C., the speed of withdrawal being up to 12 m/min and the draw-off rolls being cooled to 15° C. In the single-shaft extruder there was furthermore used a screen with different filter screens in order to increase the homogeneity of the melt and keep impurities away from the nozzle.

Upon the production of the foil it was found that a dwell time of the starch in the extruder of 3 minutes should not be exceeded. With a dwell time of more than 3 minutes in the extruder the starch was obviously degraded and the foil obtained was brown in color. Furthermore, it is important that the starch granulate does not stand too long (for more than 5 hours) in air before the extrusion since it will otherwise absorb water and thus vapor bubbles can be produced in the foil. By varying the speed of withdrawal it was possible to produce layer thicknesses of the starch foil of 9 to 270 $\mu$.

Sixth Example: Three-Layer Foil

A three-layer foil was produced, consisting of low-density polyethylene/starch/low-density polyethylene. As starch, the thermoplastically processable glycerol starch produced in the First Example was used, it having a water content of 0.3 wt. %.

In addition to the single-shaft extruder used in the Fifth Example, another single-shaft extruder having a compression of 1:3 and an L/D ratio of 28 was used. The temperatures on this other extruder were set from 180° C. to 190° C. and I operated with a pressure of 180 bar and a speed of rotation of about 40 rpm, whereby a temperature of the polyethylene composition of 230° was obtained. The through-put was 10 kg/hour.

The three-layer foil was withdrawn by means of a blow head and in the present example I dispensed with an intermediate layer of a block copolymer. Of course, it is advantageous to use an intermediate layer of a block copolymer in order to obtain excellent adherence between the three layers. All block copolymers, such as already mentioned in Examples 2 and 3, are suitable. Other adherence improving methods are also possible, such as, for instance, corona treatment, ozonizing, etc.

The foils prepared in Examples 5 and 6 were used on the one hand, to determine the gas-permeability and the moisture permeability, the values of which are compiled in Table 11. Furthermore, these foils were provided with coatings in accordance with the following examples.

D. Vapor Deposition on the Starch Foils Seventh Example: Vapor Deposition of Aluminum A starch foil with a layer thickness of 50 $\mu$, prepared in accordance with the Fifth Example, was treated in a high vacuum with aluminum. An aluminum vapor pressure atmosphere of $6 \times 10^{-4}$ mm Hg was selected, the coating of the starch foil being carried out on both sides for 20 minutes. The layer which built up during this time amounted to 400 nm each, or a total of 800 nm or 0.8 $\mu$.

Another starch foil was vaporized with aluminum under the same conditions on both sides for 24 minutes, thereby obtaining in each case a layer of 500 nm or, as a whole, a layer of 1000 nm.

The two starch foils which had been vapor treated with aluminum in this manner were then subjected to gas-permeability and moisture-permeability tests, the values of which are set forth in Table 11.

Eighth Example: Vapor Deposition with Silicon Oxide

Similar to the above example, a starch foil of a thickness of 80 $\mu$ was used, which had been prepared in accordance with the Fifth Example. The starch foil was vapor treated with silicon oxide in a high vacuum on both sides, silicon being vaporized by an arc in an oxygen atmosphere of $4 \times 10^{-4}$ mm Hg. The coating of the starch foil was effected for 100 minutes, at the end of which a layer of 400 nm had built up on both sides of the foil.

With a coating time of 150 minutes under the same vapor deposition conditions, a layer thickness of the silicon oxide layer of 600 nm each was obtained.

Again, gas-permeability and moisture-permeability tests were carried out on the starch foils which had been vapor deposited with silicon oxide, the values thereof being given in Table 11.

Discussion of Table 11

For Table 11, the oxygen gas-permeability as well as the permeability of water vapor were measured for different foils which had been produced in accordance with the invention.

As comparison for the foils of the invention, foils of cellulose acetate, cellulose hydrate, polyvinylidene chloride (PVDC) and PVC were also included in the experiment.

With regard to the measurement of the water-vapor permeability, it should furthermore be pointed out that this was done at 23° C. and the relative humidity in the case of the aluminum coating was 100% relative humidity, in the case of silicon oxide 75% relative humidity, and in the case of cellulose acetate, cellulose hydrate and polyethylene, 90% relative humidity.

With reference to the gas-permeability, the oxygen permeability was measured.

Discussion of the Gas-permeability

As reference values, there are to be considered the values for the PVDC and PVC foils which, as is known, find far greater use as a result of their low oxygen permeability. As compared with this, the value of the polyethylene foil shows a very high oxygen gas- permeability, while the three-layer foil with a starch intermediate layer has an oxygen permeability which is comparable to that of the PVDC foil.

The oxygen permeability of the aluminum-coated starch foils is less by a factor of 10 than that of the PVDC foil or the said three-layer foil. As compared with this, the oxygen gas-permeability of the starch foils vapor-treated with silicon oxide is somewhat poorer than that of the three-layer foil, which is possibly due to a non-optimal coating of the starch foil. In itself, the value should agree approximately with that of the three-layer foil which has a starch intermediate layer.

Discussion of the Water-Permeability

As reference, there is to be considered here the value of the polyethylene foil since, as is known, polyethylene represents an excellent moisture barrier. It is then also found that only the three-layer foil in accordance with the Sixth Example, which has a starch intermediate layer, has the same excellent value as pure polyethylene.

As compared with this, the water-vapor permeability of the starch foils coated with aluminum or silicon oxide is considerably poorer, but, to be sure, still considerably better than cellulose hydrate and cellulose acetate.

From the values in Table 11, it is clear what foil construction is to be preferred for what use. To be sure, it should also be pointed out that starch foils coated with aluminum or silicon oxide have the advantage over the three-layer foil with polyethylene that they are biologically completely and rapidly degradable, since aluminum is converted upon disposal to aluminum oxide and silicon oxide to sand.

The advantage of the starch foils coated with silicon oxide is that they are transparent.

The aspects of the invention shown in FIGS. 1 to 11 and Examples 1 to 8 refer, in each case, to examples which can be varied or modified in numerous ways. It is essential in all cases here that the starch used be substantially completely thermoplastically processable and no longer have any crystalline regions.

What is claimed is:

| Legends of Figures | |
|---|---|
| FIG. 6 | |
| x axis: | fraction of volume |
| y axis: | water activity |
| FIG. 8 | |
| y axis: | relative elongation at yield point |
| FIG. 9 | |
| y axis: | modulus of elasticity |
| FIG. 10 | |
| y axis: | stress-strain (Mna) |
| x axis: | relative elongation (%) |

TABLE 11

| Composition permeability of the foil | $O_2$ gas-permeability $[cm^2/s \times cm\ Hg]$ | water $[g/day \times m^2]$ |
|---|---|---|
| PVDC | | |
| PVC | | |
| PE/starch/PE | | |
| PE | | |
| AL/starch/AL (AL = 2 × 400 nm) | | |
| AL/starch/AL (AL = 2 × 500 nm) | | |
| $SiO_x$/starch/$SiO_x$ ($SiO_x$ = 2 × 400 nm) | | |
| Cellulose hydrate | | |
| Cellulose acetate | | |

1. A multilayer film of substantially reduced permeability comprising:
   a first layer including thermoplastically processable starch obtained by mixing native starch or a derivative thereof with at least one plasticizing agent under conditions that result in the formation of a thermoplastic melt having a water concentration of less than about 3.5% by weight while in a melted state, wherein the thermoplastically processable starch has a glass transition temperature less than room temperature; and
   at least one additional layer attached to the first layer, the at least one additional layer including a hydrophobic polymer which provides reduced gas permeability compared to the first layer by itself.

2. A multilayer film as defined in claim 1, wherein the at least one additional layer includes a blend of thermoplastically processable starch, a polyolefin, and a phase mediator which increases compatibility between the first layer and the at least one additional layer.

3. A multilayer film as defined in claim 2, wherein the thermoplastically processable starch within the blend is processed under conditions that result in the formation of a thermoplastic melt having a water content of less than about 3.5% by weight while in a melted state.

4. A multilayer film as defined in claim 3, wherein the thermoplastically processable starch is included in the blend in an amount in a range from about 30% to about 70% by weight of the blend and wherein the phase mediator comprises a block copolymer.

5. A multilayer film as defined in claim 2, wherein the polyolefin is selected from the group consisting of polyethylene, polypropylene, and mixtures thereof and wherein the phase mediator comprises a block copolymer.

6. A multilayer film as defined in claim 1, further including an intermediate layer comprising a block copolymer as an adherence promoter between the first layer and the at least one additional layer.

7. A multilayer film as defined in claim 1, further including a coating selected from the group consisting of aluminum, silicon oxide, and mixtures thereof on at least a portion of the multilayer film.

8. A multilayer film as defined in claim 2, further including a siloxane coating on at least one side which is cross-linked at least in part with itself, with the starch which is blended with the polyolefin within the at least one additional layer, or both.

9. A multilayer film as defined in claim 1, wherein the plasticizing agent is at least one of glycerol, an amino alcohol, dimethylsulfoxide, N-methylacetamide, or urea.

10. A multilayer film as defined in claim 1, wherein at least a portion of the natural moisture of the starch is withdrawn before mixing of the starch or starch derivative with the plasticizing agent.

11. A multilayer film as defined in claim 1, wherein at least a portion of the natural moisture of the starch is withdrawn during mixing of the starch or starch derivative with the plasticizing agent.

12. A multilayer film as defined in claim 1, wherein the first layer of the multilayer film is formed by at least one of slot extrusion or blowing of the thermoplastic melt that includes thermoplastically processable starch and wherein the multi-layer film is formed by at least one of slot backing or blow coextruding the first layer with the at least one additional layer.

13. A multilayer film as defined in claim 8, wherein the siloxane coating is formed by first coating at least one side of the multilayer film with a siloxane monomer and then treating the film with an electron gun, wherein the siloxane is cross-linked with itself and in part with the thermoplastically processable starch.

14. A multilayer film as defined in claim 2, wherein the film is subjected to at least one of a UV source or an electronic gun in a manner so that the starch within the blend is at least partially cross-linked with the polyolefin.

15. A multilayer film as defined in claim 3, wherein the water content of the thermoplastically processable starch within the blend is reduced to less than about 1% by weight while in a melted state.

16. A multilayer film as defined in claim 1, wherein the thermoplastically processable starch has a water content of less than about 1% by weight while in a melted state.

17. A multilayer film comprising:
 a first layer including thermoplastically processable starch obtained by mixing native starch or a derivative thereof with at least one plasticizing agent included in an amount in a range from about 20% to about 40% by weight under conditions that result in the formation of a thermoplastic melt, wherein the thermoplastically processable starch has a glass transition temperature less than room temperature; and
 at least one additional layer attached to the first layer, the at least one additional layer including a hydrophobic polymer.

18. A multilayer film as defined in claim 17, wherein the hydrophobic polymer comprises a polyolefin selected from the group consisting of polyethylene, polypropylene, and mixtures thereof.

19. A multilayer film comprising:
 a first layer including thermoplastically processable starch obtained by mixing native starch or a derivative thereof with at least one plasticizing agent included in an amount in a range from about 20% to about 40% by weight under conditions that result in the formation of a thermoplastic melt having a water content of less than about 3.5% by weight while in a melted state, wherein the thermoplastically processable starch has a glass transition temperature less than room temperature; and
 at least one additional layer attached to the first layer, the at least one additional layer comprising a blend of thermoplastically processable starch and a substantially hydrophobic polymer.

20. A multilayer film as defined in claim 19, wherein the first layer comprises a blend of the thermoplastically starch and at least one polyolefin.

* * * * *

UNITED STATES PATENT AND TRADEMARK OFFICE
CERTIFICATE OF CORRECTION

PATENT NO. : 6,242,102 B1
DATED : June 5, 2001
INVENTOR(S) : Ivan Tomka

It is certified that error appears in the above-identified patent and that said Letters Patent is hereby corrected as shown below:

Column 1,
Line 49, after "are for instance" to -- are, for instance, --

Column 3,
Line 52, after "foil" insert -- , --

Column 4,
Line 49, before "intermediate" insert -- an --
Lines 64-66, after "bodies" insert -- , --

Column 6,
Line 2, after "within" change "an" to -- a --
Line 20, after "on" insert -- the --
Line 22, before "basis" insert -- the --
Line 27, change "starch," to -- starch. --
Line 56, change "Inbetween" to -- In between --

Column 11,
Line 7, after "polyethylene" insert -- , --

Signed and Sealed this

Nineteenth Day of March, 2002

Attest:

Attesting Officer

JAMES E. ROGAN
Director of the United States Patent and Trademark Office